US 6,583,195 B2

(12) United States Patent
Sokol

(10) Patent No.: US 6,583,195 B2
(45) Date of Patent: Jun. 24, 2003

(54) UV CURABLE DECK SEALER

(76) Inventor: Andrew A. Sokol, 23746 Lorain Rd., North Olmsted, OH (US) 44070

(*) Notice: Subject to any disclaimer, the term of this patent is extended or adjusted under 35 U.S.C. 154(b) by 0 days.

(21) Appl. No.: 09/908,037

(22) Filed: Jul. 18, 2001

(65) Prior Publication Data

US 2002/0110643 A1 Aug. 15, 2002

Related U.S. Application Data

(60) Provisional application No. 60/219,215, filed on Jul. 18, 2000.

(51) Int. Cl.$^7$ .............................. C08F 2/46; C08F 2/50; C08F 20/14; C08F 20/18; C08F 22/20
(52) U.S. Cl. ............................. 522/7; 522/75; 522/79; 522/103; 522/182; 522/904; 522/905
(58) Field of Search .............................. 522/42, 75, 79, 522/103, 182, 904, 905

(56) References Cited

U.S. PATENT DOCUMENTS

| | | | | | |
|---|---|---|---|---|---|
| 4,282,269 A | * | 8/1981 | Lucey | ........................ | 427/514 |
| 4,415,603 A | * | 11/1983 | Valiot et al. | ................. | 427/137 |
| 4,600,649 A | * | 7/1986 | Leo | .............................. | 428/412 |
| 5,213,875 A | * | 5/1993 | Su et al. | ...................... | 427/520 |
| 5,453,451 A | * | 9/1995 | Sokol | ......................... | 427/519 |
| 5,571,570 A | * | 11/1996 | Lake | ........................... | 427/494 |
| 5,773,487 A | * | 6/1998 | Sokol | ......................... | 427/519 |

* cited by examiner

Primary Examiner—Nathan M. Nutter
(74) Attorney, Agent, or Firm—Arnold S. Weintraub, Esq.

(57) ABSTRACT

A substantially 100% solids sealer composition for use with wood and, in particular, weathered wood surfaces and other porous surfaces is prepared from a mixture of UV curable acrylates and a photoinitiator blend. The composition may further include fillers, fungicides, insect repellents, animal repellents, UV light absorbers, pigments, dyes, and the like. The photoinitiator blend is used at relatively low levels to controll the degree of polymerization.

16 Claims, No Drawings

UV CURABLE DECK SEALER

CROSS-REFERENCE TO RELATED APPLICATIONS

This application is a completion application of co-pending U.S. Provisional Application, Serial No. 60/219,215, filed Jul. 18, 2000, for "UV Curable Deck Sealer", the disclosure of which is hereby incorporated by reference.

BACKGROUND OF THE INVENTION

1. Field of the Invention

The present invention pertains to coating compositions. More particularly, the present invention concerns UV curable coating compositions. Even more particularly, the present invention concerns UV curable coating compositions particularly adapted for the treatment and protection of porous exterior structures made from wood, concrete, stone, ceramic, and other porous construction materials, which may be exposed to weathering and/or insect damage.

2. Prior Art

As is known to those skilled in the art to which the present invention pertains, the average homeowner spends thousands of dollars installing and maintaining exterior structures, such as wooden decks, wooden siding, wooden roofs, wooden doors, wooden windows, wooden shutters, concrete/asphalt driveways, sidewalks and the like, and, thereafter, watch their investment deteriorate from lack of sufficient protection from the environment and/or insects. Present day film forming exterior finishes and treatments such as paints, stains, sealers and the like simply lack significant service life for the protection of exterior surfaces, such as those enumerated above, from weathering and/or attack by biological factors.

It is well known through investigative studies performed by the United States Department of Agriculture's Forestry Products Division, that exterior wooden surfaces are structurally dynamic materials which react directly to the immediate surrounding environment. These dynamic structural properties that exterior wooden surfaces exhibit have been identified to be the most significant factor contributing to the failure of film forming exterior paints/coatings/stains on exterior wood surfaces. Simply stated, exterior wood expands and contracts in reaction to changes in humidity and temperature making long term adhesion of currently available protective film forming finishes difficult, if not impossible.

Furthermore, exposed (untreated) exterior wooden structures are susceptible to rot and/or discoloration. This discoloration is typically caused by a fungus or fungi or fungi/bacterial infestation and/or UV damage from natural sunlight and is aggravated by damage caused by seasonal and daily temperature changes. If the fungus or fungi does not infest the substrate, it may, at the least, cause discoloration. Contributing factors to exterior wood discoloration include:

(1) fungal infestation of porous surface and sub-surface structures, (2) potential fungal/bacterial digestive damage on the wood itself, (3) UV damage to the wooden surface which, with rain, may wash away surface layers of wood, thus, exposing undamaged wood to UV damage and renewing fungal nutrients and favorable conditions for fungal infestation.

In the specific case of wood, wood is comprised of three primary 'building block' materials, i.e., lignin, cellulose and hemi-cellulose. Research results from the USDA FP Div. Report that the lignin and related phenolic resin components of wood are most susceptible to UV damage due to these chromophores absorbance of ultraviolet (UV) light. Lignin acts as the primary binder that maintains the structural integrity of wood. UV damage of lignin causes discoloration and the eventual erosion of wood cells and fiber thereof. Polyphenolic compounds cause the lignin matrix to "breakdown" and be removed by the leaching action of water.

USDA investigation has, also, revealed that solvents and especially water components used in wood sealers, preservatives and stains cause specific structures in wood that control water transport in living wood i.e. trees, to inhibit the penetration of such products into the wood. These structures, have a specific and specialized function to effectively act as 'valves' that open and close to control the flow of sap and water from the roots to the leaves. These 'valves' have been shown by the USDA to still be responsive to water and solvents well after the harvesting and processing of the tree. The continued activity of these liquid-transport, controlling structures contributes to the dynamic nature of wood in direct response to ambient temperature and humidity levels.

The present invention, as is described herein, provides an improved penetrating sealer and coating system for exterior porous structures and, in particular, exterior wooden structures by capitalizing on the transport structure of the sealer to enable deeper penetration and, therefore, deeper protection to the material especially when the sealer is coupled with specific adjuvants.

SUMMARY OF THE INVENTION

The present composition comprises a substantially 100% solids or solvent- and water-free composition which may be applied by spraying, dipping, pressure treatment, brushing or rolling and comprises:

(a) a polymerizable compound which is a mixture of acrylates, the acrylate mixture comprising at least a first and a second acrylate, the first acrylate having a lower molecular weight than the second acrylate; and (b) a mixture or blend of organic photoinitiators which initiates the polymerization reaction upon exposure of the composition to ultraviolet light;

The composition hereof may further include:

(c) a filler material for controlling the penetration of the composition into the substrate;

(d) non-polymerizable, organic or inorganic, function specific additive(s) such as fungicide(s), scent oils, insect repellent(s), insecticide(s), animal repellent(s);

(e) ultraviolet light absorber(s) or stabilizer(s); and (f) pigment(s).

Given the near total absence of water and solvents in the composition of the present invention, it is able to permeate through wood without triggering liquid transport controlling or impeding structures. Thus, the composition of the present invention provides deeper penetration and correspondingly deeper protection especially when function specific adjuvants, i.e. fungicide and insect repellents, which are able to penetrate wood deeper than compositions containing solvents and/or water are incorporated herewith.

The present coating composition is particularly useful in treating wooden decks, residential and commercial wooden siding, windows, doors, trim, fences, roofing and the like. However, the present coating is also useful for application to other porous construction materials, such as, concrete/asphalt, brick and stone such as limestone and sandstone as well as masonry surfaces. Further, the present composition may be pigmented or non-pigmented, sun-cured, and may, also, define a basis for improved low UV level curable, film-forming, paints, coatings and sealers.

For a more complete understanding of the present invention, reference is made to the following detailed description and accompanying illustrative examples.

DESCRIPTION OF THE PREFERRED EMBODIMENT

As noted above, the present composition provides a substantially 100% solids or solvent- and water-free, composition which may be applied by spraying, brushing, rolling, or the like, and comprises:

(a) a polymerizable compound which is a mixture of acrylates, the acrylate mixture comprising at least a first and a second acrylate, the second acrylate having a lower mean molecular weight than the first acrylate; and (b) a mixture or blend of organic photoinitiators which initiates the polymerization reaction upon exposure of the composition to ultraviolet light.

The composition hereof may further include:

(c) a filler material for controlling the penetration of the composition into the substrate;

(d) a non-polymerizable, organic or inorganic, function specific additive(s) such as fungicide(s), scent oils, insect repellent(s), animal repellent(s);

(e) ultraviolet light absorber(s) or stabilizer(s); and (f) pigment(s).

Other typical coating additives, such as flow, wetting and dispersing agents, defoamer, plasticizers, sanding agents, stabilizers, non-reactive diluents, reinforcement fibers and the like, as well as mixtures thereof may be incorporated inot the present formulation.

With more particularity, the present composition comprises from about 60.0% to about 99.999% by weight, based on the total weight of the composition, of the polymerizable compound, and from about 0.001% to about 2.0%, by weight, based on the total weight of the composition, of the photoinitiators.

The remaining adjuvants are incorporated into the composition in a total amount ranging from about 0.001% to about 40.0%, by weight, based upon the total weight of the composition.

It has been discovered, and in accordance herewith, that the blend of photoinitiators used herein results in extraordinarily low levels of such photoiniator blend being necessary to effectuate a controlled cure of the composition in direct or indirect sunlight (extreme low level, naturally occurring UV light). As discussed below, a UV absorber where used, may be employed as a tool to control the polymerization reaction and/or enhance UV protection to those components in wood which are susceptible to damage from UV light.

The polymerizable acrylate compound used herein comprises at least a first and second acrylate of different mean molecular weights. Preferably, the second acrylate is of lower mean molecular weight than the first acrylate and, controls the viscosity and the solubility of the components of the mixture as well as other physical properties of the mixture.

Useful acrylates, incorporated as either the first or second acrylate, may be selected from commercially available unsaturated acrylic esters such as acrylic oligomers, methacrylates, monoacrylates, diacrylates, triacrylates, urethane acrylates, polyester or polyether acrylates, epoxy acrylates and mixtures thereof. Mixtures of acrylate resins may define the first acrylate as well as the second acrylate.

Suitable representative acrylates which may be used in the practice of the present invention include, for example, trimethylolpropane triacrylate; 1,6-hexanediol diacrylate and propoxylated 1,6-hexanediol diacrylate; aromatic or aliphatic urethane acrylates; epoxy acrylates such as ethoxylated Bisphenol A diacrylates; alkoxylated acrylates, such as propoxylated acrylate; and ethoxylated acrylates; modified polyester polyol acrylates; acrylated polysiloxanes; acrylated amines; acrylated amine oligomers; trifunctional acrylic esters, such as, propoxylated trimethylolpropane triacrylates and ethoxylated trimethylolpropane triacrylates; unsaturated cyclic diones; polyester diacrylates as well as other unsaturated acrylic esters. Other useful acrylates include tetrahydrofurfuryl acrylate, isobornyl acrylate, octyldecyl acrylate, ethylhexyl acrylate; dipropylene and tripropylene glycol diacrylates; acrylated oligomers and the like, as well as mixtures thereof.

In the practice of the present invention it is particularly preferred to employ a mixture of acrylates, one of which defines the first acrylate and another of which defines the second acrylate, as noted above, for both, viscosity control as well as for regulating the degree of penetration of the composition into the porous substrate. A mixture of acrylates may define the first and/or second acrylate.

Herein, a particularly preferred composition comprises a mixture of isobornyl acrylate, an aliphatic urethane acrylate as well as propoxylated trimethylolpropane triacrylate.

The acrylates including the acrylated oligomers provide chemical and physical characteristics which are resistant to damage from environmental and biological agents.

The mixture of acrylates will comprise from about 60.0% to about 99.999% of the total weight of the composition. The first and second acrylate will be present in a respective weight ratio ranging from about 1:95.67 to about 1:1.9.

The photoinitiator which is used in the composition of the present invention, as noted, is a blend or mixture of organic photoinitiators. Photoinitiators which are suitable for use in the practice of the present invention include, carbonyl compounds include ketones, such as 1-phenyl-2-hydroxy-2-methyl-1-propanone; oligo (2-hydroxy-2-methyl-1-phenyl-propan-1-one; oligo (2-hydroxy-2-methyl-1-(4-(methylvinyl) phenyl) propanone), and 2-methyl-1-[4-(methylthio)phenyl]-2-(4-morpholinol)-1-propanone; 1-(hydroxycyclohexyl) phenyl ketone and mixtures thereof; acetophenones, such as α, α-dimethoxy-alpha-phenylacetophenone); benzophenones, such as 2,4,6-trimethylbenzophenone; 4-methylbenzophenone, and other such benzophenone derivatives; non-carbonyl-containing photoinitiators, include phosphine oxide and derivatives thereof such as phenyl bis[2,4,6-trimethyl benzoyl] phosphine oxide and bis(2,6 dimethoxybenzoyl) phosphine oxide; (2,4,4-trimethylpentyl)phosphine oxide as well as mixtures thereof.

The benzophenone derivatives may be aldehyde-substituted benzophenones, cycloalkyl-substituted or aryl-substituted benzophenones. Furthermore the substituted component may be further substituted with alkyl or aryl substituents. The phosphine oxide may be similarly substituted.

As noted, above, the mixture of photoinitiators will comprise from about 0.001% to about 2.0% of the total weight of the composition.

The preferred photoinitiator hereof is a unique combination or blend of photoinitiators. A particularly useful or preferred photoinitiator comprises a mixture of:

(a) a blend of:
  (1) bis (2,6-dimethoxybenzoyl) (2,4,4-trimethylpentyl) phosphine oxide; and
  (2) 1-hydroxycyclohexyl phenyl ketone;
(b) 2-methyl-1-[4-(methylthio)phenyl]-2-[4-morpholinyl)-1-propanone, and
(c) a mixture or blend of:
  (1) 2,4,6-trimethylbenzophenone,
  (2) 4-methylbenzophenone; and,
  (3) oligo(2-hydroxy-2-methyl-1-4-methylvinyl) phenyl) propanone.

These photoinitiator blends are well known and commercially available. Photoinitiators (a) and (b) are sold under the marks Irgacure™ 1800 and 907, respectively, by Ciba Specialty Chemicals. Photoinitiator (c) is sold by Sartomer under the name Esacure™ KTO 46.

These photoinitiators are present in a respective weight ratio ranges of 0.5–1.0:0.03–1.0:0.5–1.0. As noted, the photoinitiator admixture or blend is present in amount ranging from about 0.001 to about 2.0% by weight, based upon the total weight of the composition and, preferably, from about 0.001% to about 1.0% by weight, based on the total weight of the composition.

It is to be appreciated that the amount of photoinitiator used herein is significantly less than that heretofore taught in the art, as for example as disclosed in U.S. Pat. No. 5,453,451 the disclosure of which is hereby incorporated by reference.

The instant composition may contain certain adjuvants or combinations of adjuvants in order to achieve the requisite properties of the component.

Thus, it is contemplated that a filler may be admixed into the composition. The filler not only fills the pores of the surface, but, also, aids in controlling the penetration of the composition into the porous substrate. As penetrating properties vary over the various types of concrete formulations, types of ceramic and masonry and from species to species of wood, such penetrating controls are necessary in designing penetrating properties appropriate to provide surface protection to the target substrate. Without such penetration controls, it is possible that the present composition will penetrate through the target substrate.

Any inert filler which is compatible with the acrylates and photoinitiator and other adjuvants may be used herein. Thus, fumed silica; polymer fillers such as polyethylene and polytetraflouroethylene; cellulosic fillers; filler clays, such as betonite clay, kieselguhr earth and the like, as well as mixtures thereof may be used herein. Where used, the filler will comprise from about 0.01% to about 4.0%, by weight, based upon the total weight of the composition. In the practice of the present invention, the preferred filler is a fumed silica.

In order to put the filler into the admixture a dispersant may be used. Any suitable dispersant for enabling the filler to be dispersed into the coating composition may be used herein. Generally, from about 0.01% to about 2.0% by weight, based upon the total weight of the composition, is employed. A preferred dispersant is that sold commercially under the name Disperbyk 163 by Byk Chemie.

The present composition may also incorporate a fungicide to inhibit fungal infestation or growth. Again, any suitable fungicide or combination of fungicides, organic or inorganic, which is compatible with the other components hereof may be used herein. Generally, the fungicide(s) will be present in an amount ranging from about 0.01 to about 15.0%, by weight, based upon the total weight of the composition. In the practice of the present invention a particularly preferred fungicide is that which is commercially available and sold under the name Proxel GXL (1,2-benzisothiazolin-3-one) by Avecia.

Because of the market demand for protection against UV damage, a UV absorber, or a combination of UV blockers or Hindered Amine Light Stabilizer (HALS) may be incorporated herewith. Generally, the UV blocker(s) will be present in an amount ranging from about 0.01 to about 5.0% by weight, based upon the total weight of the composition. The 'UV blocker' is any one of the Hindered Amine Light Stabilizer (HALS) or UV absorber type which are well known and commercially available and which, generally, comprise: sebacate; decanedioic, propanoic, and propanoic $C_{n-9}$-branched alkyl esters; benzoxazole, oxirane compounds; hydroxyhydrocinnamantate, hydroxyhydrophosphate, benzotriazole triazine derivatives and the like as well as mixtures thereof. In the practice of the present invention it is preferred to employ a HALS UV absorber that is sold by Ciba under the name Tinuvin 292, which is a blend of 1, 2,2,6,6-pentamethyl-4-piperidinol, bis(1,2,2,6,6-pentamethyl-4-piperidenyl) sebacate and methyl (1,2,2,6,6-pentamethyl-4-piperidenyl) sebacate.

Also, natural or synthetic insect repellents such as a thiazole, citronella, or cedarwood oil (scent) may be incorporated into the composition in effective quantities. Additionally, animal repellents may similarly be incorporated into the mixture. Such repellents include synthetic or natural animal extracts commercially available to repel animals from eating or living in or on treated structures.

Commercially available insecticides may also be incorporated into the mixture at effective concentrations. A particularly useful insecticide is o, o-diethyl o-(3,5,6-trichloro-2-pyridinyl), marketed by Dow Agro Sciences under the trade name Dursban™.

Commercially available fungicides may also be incorporated into the mixture as effective concentrations. A particularly useful fungicide is 3-iodo-2-propynyl butyl carbamate, marketed by Troy Chemical Corp. Under the trade name Troysan Polyphase™.

Incorporating non-polymerizable insect, animal repellents and fungicides which do not participate in the polymerization of the acrylate esters, enhances the sealer.

It has been found that the present composition is absorbed into the wood providing a deeper penetration and longer term protection against weathering, erosion and fungal attack. In essence, upon polymerization, the composition hereof becomes part of the cellular structure of the wood, itself. The present composition, as shown by spectroscopic studies, cures from the center of the coating layer outward due to a phenomenon known to those skilled in the art as oxygen inhibited cure.

It is to be appreciated by one skilled in the art that the penetrating acrylate resins acts to stabilize lignin by immersing the lignin and other wood components and structures in a liquid resin, which then becomes a solid polymer. The resulting polymer is formulated to be resistant to environmental damage such as UV and biological attack. The acrylate resins enter the substrate in the same means that water and water borne biological agents do and then solidifies (polymerizes) in and throughout the porous substrate thereby occupying, obstructing and reducing the channels by which subsequent water borne agents may enter the substrate. Thus, freeze-thaw damage is reduced by reducing the substrate's permeability to water. Further, fungal infestation and subsequent damage from water borne fungal agents is reduced.

Further, the present composition eliminates the use of solvents and/or water as viscosity moderating factors in the formulation of wood sealers, preservatives and stains. Until the present invention, sealers, preservatives and stains have incorporated water and/or solvents, such as mineral spirits, to maintain the formula solids in a liquid state. The water or solvent heretofore was relied upon to facilitate application of the solids, while upon evaporation of these components deposited solids would be left dry to the touch.

In manufacturing the present composition the fillers, dispersants, fungicides, UV blockers, the photoinitiator mixture and the acrylates are dispersed or mixed together at ambient conditions and at high shear until the composition is homogeneous.

It should be noted that in the preferred composition, depending on the amount of adjuvants which are added hereto, it is the amount of the largest occurring or present triacrylate which is adjusted, accordingly. After mixing the composition it is filtered and allowed to stand to release any entrapped air due to the high shear mixing process.

The present composition is storage stable without evidencing any separation or settling of the acrylic components over an extended period of time. Typically, if there is any component settling of the inert filler(s) and pigments the composition can be rendered homogeneous with manual stirring.

It is to be appreciated the present composition is both organic solvent-free as well as water-free rendering the composition substantially 100% solids save for any scent oils or insect repellents or UV absorbers or dyes/pigments.

The composition will cure in a period ranging from about 0.25 hours to about 48 hours depending on the degree of sunlight and degree of porosity of the substrate.

In use and to achieve optimal aesthetics of the wood, the present composition is applied to a cleaned weathered, exterior wood surface which has been treated and scrubbed to remove any aged, discolored or damaged surface material. It must be appreciated that most exterior porous surfaces, not only wood, are susceptible to infestation and discoloration from biological agents as well as waterborne and airborne dirt. Therefore, this cleaning process is not limited to wood surfaces, but to any exterior porous surfaces, not only wood, which are susceptible to infestation and discoloration from biological agents as well as waterborne and airborne dirt. This cleaning process optimizes the final aesthetics of the exterior wood surface, but is not vital to the efficacy of the present composition. Furthermore, the composition is applied to a substantially dry surface having been allowed about 48 hours time to dry from last having been exposed to water.

A method of preparing or cleaning weathered, exterior wood surfaces of both sun and physically damaged wood in preparation for sealing with the present composition is a single step and, preferably, a two-step process. Generally, as a first step, the process comprises applying a bleaching (or oxidizing) agent to the construction material or substrate and an optional second step comprising applying an acidic agent thereto. The application may be achieved by any suitable method such as spraying, rolling or brushing. As noted below, the process may comprise solely the application of the bleaching agent.

The bleaching agent serves a three-fold purpose, i.e., as an anti-biologial agent, a bleaching agent and a cleaning agent. First, the bleaching agent serves to kill fungal, bacterial and other bioforms on and in the wood surface. Secondly, the bleaching agent functions to render the bioform remains colorless while promoting the bleaching of other wood stains. Further, the bleaching agent aids in the dissolving and the removing of UV damaged wood components. The effective dwell time which renders the bleach effective is directly dependent upon the type and concentration of the bleaching agent and the ambient temperature of the substrate and bleaching agent. This dwell time typically varies from as little as less than one minute to as long as several hours prior to neutralization or rinsing with water. If used as a stand alone treatment, the bleaching agent is rinsed off with, preferably, pressurized water with or without manual scrubbing of the surface to aid in removing surface debris. Suitable pressurized water, such as from a typical garden hose, is sufficient to wash away the bleaching agent and debris.

When the bleaching step is followed by an acid treatment step, then, the rinsing away of the bleaching agent with water is optional and is not necessary. The direct application of the acidic agent over the bleaching agent is acceptable practice.

The bleaching step may be used independently of any other preparation for using the present composition and does not require a following acid treatment. However such follow-on acid treatement, step has been found effective in both neutralizing the bleaching agent and in suppressing a bleaching appearance by promoting the development of the natural colors inherent in the wood.

Thus, the second or acid treatment step serves to at least partially neutralize the alkaline bleaching agent, promote the development of the wood's inherent natural colors and to wash away any remaining debris which may be acid soluble. The effective dwell time which renders the acidic agent effective is directly dependent upon the type and concentration of the acidic agent, the concentration and type of the bleaching agent to be neutralized and the ambient temperature of the substrate and acidic agent. This dwell time typically varies from as little as less than one minute to as long as several hours prior to rinsing with water (physically scrubbing the surface is optional). Ordinarily, it is not effective to use the acidic agent as a stand alone treatment. The acidic agent is rinsed off with, preferably pressurized, water with or without manual scrubbing of the surface to aid in removing surface debris. Suitable pressurized water, such as from a typical garden hose, is sufficient to wash away the acidic agent and debris.

It is to be appreciated that the preferred two-step preparatory treatment eliminates the need to pressure wash exterior wood surfaces prior to application of the sealer. Prior to this, it was typically required to pressure wash exterior wood surfaces to remove damaged surface wood and stains prior to sealing. The present two-step process enables optimal results with the present composition while eliminating the need for costly pressure washing. Further, if it is opted to pressure wash wood surfaces along with the present two-step preparation, care must be taken not to damage the surface with excessive blasting force from the pressure wash nozzle.

Useful bleaching agents include an aqueous solution of effective concentrations selected from the group consisting of chlorinated and non-chlorinated bleaching agents such as sodium metasilicate; sodium sesquicarbonate, sodium hypochlorite and the like. Such aqueous bleaching solution may comprise a blend of suitable bleaching agents.

The acidic agent may be an aqueous solution of an effective concentration of organic acids selected from the group consisting of oxalic acid, sucinnic acid, boric acid and the like as well as mixtures thereof.

The present sealer composition can be applied in any suitable manner such as by spray, brush, roller or the like. When sprayed, there is provided a homogeneous mixture issuing from the nozzle of the spray equipment. "Homogeneous" is understood to mean that the composition of each droplet in the issued spray is substantially of the same composition as that from the reservoir from which the material to be sprayed was drawn. Because of the nature of the composition the acrylates are able to permeate a porous substrate until the substrate is saturated. However, total saturation is not required for the present invention to be effective. It is only required that the outer surface be treated, with deeper protection being achieved as more of the mixture is absorbed, until full saturation occurs.

From the above it is apparent that there is provided a unique sealant composition and preparation system particularly adapted for exterior surfaces and which is applied to a porous surface by any suitable technique.

For a more complete understanding of the present invention, reference is made to the following illustrative example. In the example all parts are by weight absent indications to the contrary.

EXAMPLE I

| Ingredient | Amount, pbw |
|---|---|
| Fumed Silica | 10.000 |
| Dispersant[1] | 5.000 |
| Fungicide | 5.000 |
| UV Blocker[2] | 0.9300 |
| Photoinitiator[3] | 0.0900 |
| Photoinitiator[4] | 0.0025 |
| Photoinitiator[5] | 0.0900 |
| Isobornyl acrylate | 12.3400 |
| Aliphatic urethane acrylate | 8.3400 |
| Propoxylated trimethylol propane triacrylate | 76.2050 |
| Insect repellant/scent | 0.9000 |
| | 100.0000 |

[1]Disperbyk 163
[2]Tinuvin 292
[3]Irgacure 1800
[4]Irgacure 907
[5]Esacure KTO 46

In preparing the composition, all of the components except for the triacrylate and the scent were mixed together in a suitable vessel equipped with a high shear stirrer until homogenous. Thereafter, the triacrylate and scent were added, at high shear, for about thirty-five minutes maintained at approximately 1800 rpm.

Thereafter, the composition was filtered to remove any undispersed filler. Then, the composition was allowed to stand for a sufficient time to permit the release of entrained air prior to weighing and packaging.

This composition was ready for use as a sealer for porous material including exterior wood, concrete, masonry, stone and ceramic as well.

EXAMPLE II

The procedure of Example I was repeated, but using the following components:

| Ingredient | Amount, pbw |
|---|---|
| Photoinitiator[1] | 0.0900 |
| Photoinitiator[2] | 0.0025 |
| Photoinitiator[3] | 0.0900 |
| Isobornyl acrylate | 12.3400 |
| Aliphatic urethane acrylate | 1.0000 |
| Propoxylated trimethylol propane triacrylate | 86.4775 |
| | 100.0000 |

[1]Irgacure 1800
[2]Irgacure 907
[3]Esacure KTO 46

EXAMPLE III

The procedure of Example I was repeated, but using the following components:

| Ingredient | Amount, pbw |
|---|---|
| UV Blocker[4] | 0.9300 |
| Photoinitiator[1] | 0.0900 |
| Photoinitiator[2] | 0.0025 |
| Photoinitiator[3] | 0.0900 |
| Isobornyl acrylate | 12.3400 |
| Aliphatic urethane acrylate | 8.3400 |
| Propoxylated trimethylol propane triacrylate | 78.2075 |
| | 100.0000 |

[1]Irgacure 1800
[2]Irgacure 907
[3]Esacure KTO 46
[4]Tinuvin 292

EXAMPLE IV

A deck sealer in accordance with the present invention was prepared from the following ingredients, using the procedure of Example I:

| Ingredient | Amount pbw |
|---|---|
| UV Blocker[1] | 0.9300 |
| Photoinitiator[2] | 0.0900 |
| Photoinitiator[3] | 0.0025 |
| Photoinitiator[4] | 0.0900 |
| Isobornyl acrylate | 16.000 |
| Aliphatic urethane acrylate | 24.000 |
| Propoxylated trimethylol propane triacrylate | 58.8875 |
| | 100.0000 |

[1]Tinuvin 292
[2]Irgacure 1800
[3]Irgacure 907
[4]Esacure KTO 46

EXAMPLE V

A deck sealer in accordance with the present invention was prepared from the following ingredients, using the procedure of Example I:

| Ingredient | Amount pbw |
| --- | --- |
| Fumed Silica | 1.0 |
| Dispersant[(1)] | 0.1 |
| Fungicide | 0.1 |
| UV Blocker[(5)] | 0.9300 |
| Photoinitiator[(2)] | 0.0900 |
| Photoinitiator[(3)] | 0.0025 |
| Photoinitiator[(4)] | 0.0900 |
| Isobornyl acrylate | 12.3400 |
| Aliphatic urethane acrylate | 8.3400 |
| Propoxylated trimethylol propane triacrylate | 77.0075 |
| | 100.0000 |

[(1)]Disperbyk 163
[(2)]Irgacure 1800
[(3)]Irgacure 907
[(4)]Esacure KTO 46
[(5)]Tinuvin 292

EXAMPLE VI

A deck sealer in accordance with the present invention was prepared from the following ingredients, using the procedure of Example I:

| Ingredient | Amount pbw |
| --- | --- |
| Fumed Silica | 2.0 |
| Dispersant[(1)] | 3.0 |
| Fungicide | 1.0 |
| UV Blocker[(5)] | 0.9300 |
| Photoinitiator[(2)] | 0.0900 |
| Photoinitiator[(3)] | 0.0025 |
| Photoinitiator[(4)] | 0.0900 |
| Isobornyl acrylate | 12.3400 |
| Aliphatic urethane acrylate | 8.3400 |
| Propoxylated trimethylol propane triacrylate | 70.247 |
| Insect repellent/scent | 2.0 |
| | 100.0000 |

[(1)]Disperbyk 163
[(2)]Irgacure 1800
[(3)]Irgacure 907
[(4)]Esacure KTO 46
[(5)]Tinuvin 292

EXAMPLE VII

A deck sealer in accordance with the present invention was prepared from the following ingredients, using the procedure of Example I:

| Ingredient | Amount pbw |
| --- | --- |
| Fungicide | 1.000 |
| UV Blocker[(4)] | 0.9300 |
| Photoinitiator[(1)] | 0.0900 |
| Photoinitiator[(2)] | 0.0025 |
| Photoinitiator[(3)] | 0.0900 |
| Isobornyl acrylate | 12.3400 |
| Aliphatic urethane acrylate | 8.3400 |
| Propoxylated trimethylol propane triacrylate | 52.2075 |
| Insect repellent/scent | 0.5 |
| Pigments/Dyes | 25.0 |
| | 100.0000 |

[(1)]Irgacure 1800
[(2)]Irgacure 907
[(3)]Esacure KTO 46
[(4)]Tinuvin 292

EXAMPLE VIII

Following the procedure of Example I, a deck sealer was prepared from the following:

| Ingredient | Amount pbw |
| --- | --- |
| Fumed Silica | 0.7500 |
| Dispersant[(1)] | 0.5000 |
| Fungicide | 0.1000 |
| UV Blocker[(5)] | 0.9300 |
| Photoinitiator[(2)] | 0.0900 |
| Photoinitiator[(3)] | 0.0025 |
| Photoinitiator[(4)] | 0.0900 |
| Isobornyl acrylate | 12.3400 |
| Aliphatic urethane acrylate | 8.3400 |
| Propoxylated trimethylol propane triacrylate | 76.2050 |
| Insect repellent/scent | 0.90 |
| | 100.0000 |

[(1)]Disperbyk 163
[(2)]Irgacure 1800
[(3)]Irgacure 907
[(4)]Esacure KTO 46
[(5)]Tinuvin 292

It is possible to pigment the present composition as a "stain" to achieve aesthetic effects. Pigmentation of the clear resin composition is accomplished by incorporating UV stable (light fast) dry pigments or dyes which are suitable for outdoor use. Such pigment, or combination of pigments would be present in an amount of from about 0–40% by weight of the total composition. Pigments or dyes may be directly added during the high speed mixing or may first be ground into the clear resin in order to make a color concentrate/paste which is then, accordingly, added during the high speed mixing of the clear bulk resin.

Given the near total absence of water and solvents in the composition of the present invention, the present composition is able to permeate through wood without triggering such liquid transport controlling structures. Thus, the composition of the present invention provides deeper penetration and correspondingly deeper protection especially when function specific adjuvants i.e. fungicide and insect repellents which are able to penetrate wood deeper than compositions containing solvents and/or water are incorporated herewith.

Having, thus, described the invention, what is claimed is:

1. A substantially 100% solids sealant composition for application to a porous surface which comprises:
   (a) a polymerizable compound which is a mixture of acrylates, the acrylate mixture comprising at least a first and a second acrylate, the second acrylate having a lower mean molecular weight than the first acrylate; and
   (b) a mixture of organic photoinitiators which initiates the polymerization reaction upon exposure of the composition to ultraviolet light, the mixture consisting essentially of:

(1) a blend of:
  (a) phosphine oxide;
  (b) a phenyl ketone;
(2) a first propanone; and
(3) a mixture of:
  (a) a first benzophenone;
  (b) a second benzophenone, the second benzophenone being different from the first benzophenone;
  (c) a second propanone, the second propanone being different from the first propanone, and wherein the mixture of photoinitiators is present in a respective weight ratio of (a) to (b) to (c) of 0.5–1.0:0.031.0:0.51.0.

2. The sealer composition of claim 1, which further comprises an adjuvant selected from the group consisting of:
  (a) an inert filler material for controlling the penetration of the composition into the substrate;
  (b) a non-polymerizable fungicide;
  (c) a scent oil;
  (d) an insect repellent;
  (e) an animal repellent;
  (f) an ultraviolet light absorber;
  (g) a pigment; and
  (h) mixtures thereof.

3. The sealer composition of claim 1, which comprises: from about 60.0% to about 99.99%, by weight, based on the total weight of the composition of the polymerizable compound, and from about 0.001% to about 2.0% by weight, based on the total weight of the composition of the photoinitiator mixture.

4. The sealer composition of claim 2, wherein the adjuvants are present in an amount ranging from about 0.001% to about 40.0%, by weight, based upon the total weight of the composition.

5. The sealer composition of claim 1, wherein the first and second acrylates are each selected from the group consisting of:
  (a) unsaturated acrylic esters, acrylic oligomers, methacrylates, monoacrylates, diacrylates, triacrylates, urethane acrylates, polyester acrylates, polyether acrylates, epoxy acrylates and mixtures thereof.

6. The sealer composition of claim 5, wherein the first and second acrylates are each selected from the group consisting of:
  trimethylopropane triacrylate; 1,6-hexanediol diacrylate; propoxylated 1,6-hexanediol diacrylate; aromatic and aliphatic urethane acrylates; epoxy acrylates; alkoxylated acrylates, modified polyester polyol acrylates; acrylated polysiloxanes; acrylated amines; acrylated amine oligomers; propoxylated trimethylolpropane triacrylates; ethoxylated trimethylolpropane triacrylates; unsaturated cyclic diones; polyester diacrylates, tetrahydrofurfuryl acrylate, isobornyl acrylate, octyldecyl acrylate, ethylhexyl acrylate; dipropylene and tripropylene glycol diacrylates; acrylated oligomers and mixtures thereof.

7. The sealer composition of claim 6, wherein each of the first and second acrylates includes a mixture of:
  (a) an isobornyl acrylate;
  (b) an aliphatic urethane acrylate; and
  (c) a propoxylated trimethylolpropane triacrylate.

8. The sealer composition of claim 1, wherein:
  (a) the first and second propanones are selected from the group consisting of: 1-phenyl-2-hydroxy-2-methyl-1-propanone; oligo (2-hydroxy-2-methyl-1-phenyl-propan-1-one; oligo (2-hydroxy-2-methyl-1-(4-(methylvinyl) phenyl) propanone), and 2-methyl-1-[4-(methylthio)phenyl]-2-(4-morpholinol)-1-propanone; 1-(hydroxycyclohexyl) phenyl ketone and mixtures thereof;
  (b) the benzophenone is selected from the group consisting of 2,4,6-trimethylbenzophenone; 4-methylbenzophenone and mixtures thereof and
  (c) the phosphine oxide is selected from the group consisting of: phenyl bis(2,4,6--trimethyl benzoyl) phosphine oxide and bis(2,6 dimethoxybenzoyl) phosphine oxide; (2,4,4-trimethylpentyl)phosphine oxide and mixtures thereof.

9. The sealer composition of claim 8, wherein the photoinitiator comprises a mixture of:
  (a) a blend of:
    (1) his (2,6-dimethoxybenzoyl) (2,4,4-trimethylpentyl) phosphine oxide;
    (2) 1-hydroxycyclohexyl phenyl ketone;
  (b) 2-methyl-1-[4-(methylthio) phenyl]-2-[4-morpholinyl)-1-propanone;
  (c) a mixture of:
    (1) 2,4,6-trimethylbenzophenone,
    (2) 4-methylbenzophenone; and,
    (3) oligo (2-hydroxy-2-methyl-1-4-methylvinyl) phenyl) propanone.

10. The composition of claim 1, which further includes an adjuvant which is at least one of:
  (a) a flow agent;
  (b) a dispensing agent;
  (c) a defoamer;
  (d) a plasticizer;
  (e) a sanding agent;
  (f) a stabilizer;
  (g) a non-reactive diluent;
  (h) a reinforcement fiber; and
  (i) and mixtures thereof.

11. A substantially 100% solids sealant composition for application to a porous surface which comprises:
  (a) a polymerizable compound which is a mixture of acrylates, the acrylate mixture comprising at least a first acrylate and a second acrylate, the second acrylate having a lower mean molecular weight than the first acrylate;
  (b) a mixture of organic photoinitiators selected from the group consisting at least one ketone, at least one benzophenone and at least one phosphine oxide, the mixture comprising from about 0.001% to about 2.0% by weight, based on the total weight of the composition; and
  (c) a filler for controlling the degree of penetration of the composition into the surface, the filler being selected from the group consisting of fumed silica, polyethylene, polytetrafluoroethylene, clays, kiesulguhr earth and mixtures thereof.

12. The composition of claim 1, wherein the mixture of photoinitiators consists essentially of:
  (a) a mixture of organic photoinitiators which initiates the polymerization reaction upon exposure of the composition to ultraviolet light, the mixture consisting essentially of:
    (1) a blend of:
      (a) phosphine oxide;
      (b) a phenyl ketone;

(2) a first propanone; and
(3) a mixture of:
  (a) a first benzophenone;
  (b) a second benzophenone, the second benzophenone being different from the first benzophenone;
  (c) a second propanone, the second propanone being different form the first propanone, and wherein the mixture of photoinitiators is present in a respective weight ratio of (a) to (b) to (c) of 0.5–1.0:0.03–1.0:0.5–1.0.

13. The sealer composition of claim 5, wherein the first and second acrylates are each selected from the group consisting of:

trimethylopropane triacrylate; 1,6-hexanediol diacrylate; proposylated 1,6-hexanediol diacrylate; aromatic and aliphatic urethane acrylates; epoxy acrylates; alkoxylated acrylates, modified polyester polyol acrylates; acrylated polysiloxanes; acrylated amines; acrylated amine oligomers; propoxylated trimethyloipropane triacrylates; ethoxylated trimethyloipropane triacrylates; unsaturated cyclic diones; polyester diacrylates, tetrahydrofurfuryl arylate, isobornyl acrylate, octyldecyl acrylate, ethylhexyl arylate; dipropylene and tripropylene glycol diacrylates; acrylated oligomers and mixtures thereof.

14. The sealer composition of claim 1, wherein:
(a) the first and second propanones are selected from the group consisting of: 1-phenyl-2-hydroxy-2-methyl-1-propanone; oligo (2-hydroxy-2-methyl-1-phenyl-propan-1-one; oligo (2-hydroxy-2-methyl-1-(4-(methylvinyl) phenyl) propanone), and 2-methyl-1-[4-(methylthio)phenyl]-2-(4-morpholinol)-1-propanone; 1-(hydroxycyclohexyl) phenyl ketone and mixtures thereof and (b) the benzophenone is selected from the group consisting of 2,4,6-trimethylbenzophenone; 4-methylbenzophenone and mixtures thereof and
(d) the phosphine oxide is selected from the group consisting of: phenyl bis(2,4,6--trimethyl benzoyl) phosphine oxide and bis(2,6 dimethoxybenzoyl) phosphine oxide; (2,4,4-trimethylpentyl)phosphine oxide as well as mixtures thereof.

15. The sealer composition of claim 8, wherein the photoinitiator comprises a mixture of:
(a) a blend of:
  (1) bis (2,6-dimethoxybenzoyl) (2,4,4-trimethylpentyl) phosphine oxide;
  (2) 1-hydroxycyclohexyl phenyl ketone;
(b) 2-methyl-1-[4-(methylthio) phenyl]-2-[4-morpholinyl)-1-propanone;
(c) a mixture of:
  (1) 2,4,6-trimethylbenzophenone,
  (2) 4-methylbenzophenone; and,
  (3) oligo (2-hydroxy-2-methyl-1-4-methylvinyl) phenyl) propanone.

16. The composition of claim 1, which further includes at least one of:
(a) a flow agent;
(b) a dispensing agent;
(c) a defoamer;
(d) a plasticizer;
(e) a sanding agent;
(f) a stabilizer;
(g) a non-reactive diluent;
(h) a reinforcement fiber; and
(i) and mixtures thereof.

* * * * *